(12) United States Patent
Honda

(10) Patent No.: US 6,364,370 B1
(45) Date of Patent: Apr. 2, 2002

(54) PIPE JOINT

(76) Inventor: Katsuji Honda, No. 22-10, 3-chome, Shinkoiwa, Katsushika-Ku, Tokyo (JP)

( * ) Notice: Subject to any disclaimer, the term of this patent is extended or adjusted under 35 U.S.C. 154(b) by 0 days.

(21) Appl. No.: 09/537,942

(22) Filed: Mar. 29, 2000

(30) Foreign Application Priority Data

Aug. 8, 2001 (JP) ............................................ 11-088453

(51) Int. Cl.$^7$ ................................................ F16L 21/04
(52) U.S. Cl. ........................................ 285/322; 285/104
(58) Field of Search ................................ 285/104, 105, 285/374, 379, 375, 322

(56) References Cited

U.S. PATENT DOCUMENTS

| | | | |
|---|---|---|---|
| 2,346,051 A | * 4/1944 | Seamark | 285/104 X |
| 3,409,314 A | * 11/1968 | Roe | 285/322 X |
| 3,899,183 A | * 8/1975 | Wild et al. | 285/104 X |
| 3,920,270 A | * 11/1975 | Babb, Jr. | 285/104 |
| 5,269,569 A | * 12/1993 | Weber et al. | 285/104 |
| 5,476,290 A | * 12/1995 | Bergmann et al. | 285/322 X |
| 5,524,940 A | * 6/1996 | Wartluft | 285/322 |
| 5,988,695 A | * 11/1999 | Corbett, Jr. | 285/374 X |

FOREIGN PATENT DOCUMENTS

JP 6159565 * 6/1994 ................ 285/105

\* cited by examiner

Primary Examiner—Lynne H. Browne
Assistant Examiner—David E. Bochna
(74) Attorney, Agent, or Firm—Adams & Wilks

(57) ABSTRACT

To provide a pipe joint which can be easily assembled and can maintain the connection of pipes firmly while simplifying the pipe connecting work. Tapered surfaces 6 which reduce in diameter toward openings 2 are formed on inner peripheral portions of half portions of a tube 1 in order to join pipes A and B together, and a diameter-reducible elastic wedge ring 7 is disposed on the large inside diameter portion of the tapered surface 6. In order that when the pipes A and B are about to slip out, the wedge rings 7 are pressed out along the tapered surfaces 6 to reduce a diameter thereof, rubber rings 10 capable of being placed in close contact with the pipes A and B are engaged with and held on sliding rings 8 capable of sliding smoothly along the inner periphery of the tube 1 and provided adjacent to the wedge rings 7. When the wedge rings 7 assume a diameter-reduced state, they are encroached on the outer peripheral surfaces of the pipes A and B to prevent the pipes from slipping out.

4 Claims, 2 Drawing Sheets

PIPE JOINT

BACKGROUND OF THE INVENTION

1. Field of the Invention

The present invention relates to a pipe joint for joining an end of one pipe and an end of the other pipe together, and particularly to a pipe joint suitable for use with a connection of pipes embedded in the ground so as to encase an electric cable therein.

2. Related Art

As an example, a conventional pipe joint is disclosed in Japanese Patent Application Laid-Open No. 10 (1998)-176774 Publication, which is constituted as shown in FIG. 2 taken from the Publication.

That is, a pipe 22 inserted into a main tube 20 through an inserting inlet 21 can be initially fitted in and out. When the pipe 22 is actually connected, a projecting ring 40 is secured to the outer peripheral surface of the pipe 22 by introducing an adhesive 25 through an introducing inlet 26 formed in the wall of the main tube 20. When the pipe 22 is about to be pulled out by the external force relatively from the main tube 20, the projecting ring 40 secured to the pipe 22 presses a diameter-reducible elastic wedge ring 34 with a split groove 35 through an O-ring 36, and when the wedge ring 34 moves along a tapered surface 30 in the inner peripheral surface of the main tube 20 to assume a diameter-reducible state, the wedge ring 34 is encroached on the outer peripheral surface of the pipe 22 so as to prevent the pipe 22 from being disengaged. It is noted that the introducing inlet 26 is provided with a stop plug 28.

Incidentally, in the conventional pipe joint as mentioned above, the pipe 22 can be fitted in and out of the main tube 20, in the initial period of the pipe connecting work, unless the adhesive 25 is introduced. Therefore, there is obtained the merit of giving the adjusting work time, and on the other hand, there poses a problem that the construction is complicated, and in addition, operation for introducing the adhesive is necessary when pipes are connected together.

From a viewpoint of the above, it is an object of the present invention to provide a pipe joint which can be easily assembled and can maintain the connection of pipes firmly while simplifying the pipe connecting work.

SUMMARY OF THE INVENTION

For achieving the aforementioned object, according to the present invention, there is provided a pipe joint characterized in that in a tube having pipe inserting openings on opposite ends thereof so as to overlap on outer peripheral surfaces of ends of a pair of pipes to be joined together, inner peripheral portions of both half portions of the tube are formed with corresponding tapered surfaces gradually reduced in the inside diameter toward the openings, a wedge ring is charged into a large inside diameter portion of the tapered surface, the wedge ring being constituted in the form of an elastic wedge ring with a diameter reducing spilt groove in order to encroach on the outer peripheral surfaces of the pipes in the elastic diameter-reduced state when the wedge ring moves toward a small inside diameter portion of the tapered surface, a sliding ring capable of smoothly sliding along the inner surface of the tube is provided adjacent to the wedge ring in the large inside diameter portion of the tapered surface, a sliding-preventing shoulder for preventing the sliding ring from sliding in a direction away from the wedge ring is formed in the inner peripheral direction of the tube, and a rubber ring capable of being placed in close contact with the outer peripheral surface of the pipes inserted from the openings is engaged with and held on the inner peripheral portion of the sliding ring.

Further, according to the present invention, there is provided the pipe joint wherein a peripheral edge of one end of the rubber ring is present between the sliding ring and the wedge ring, and a peripheral edge of the other end of the rubber ring is present between the sliding ring and the sliding-preventing shoulder.

Further, according to the present invention, there is provided the pipe joint wherein the sliding ring is formed of hard plastic material, a convex portion formed on the outer periphery of the rubber ring is fitted in a recess formed along the inner periphery of the sliding ring.

In the aforementioned pipe joint according to the present invention, when the pipes joined together are inserted into the tube through the openings of the tube, the rubber ring engaged with and held on the inner peripheral portion of the sliding ring within the tube assumes a state in close contact with the outer peripheral surface of the pipe. In this manner, a pair of pipes inserted from the openings on the both ends of the tube is connected.

When the pipes receive the external force in a direction of slipping out of the tube, the rubber ring in close contact with the tube also moves toward the openings along with the tube. Such a movement of the rubber ring as described is carried out without trouble since the sliding ring integral with the rubber ring can be slidably moved smoothly along the inner surface of the tube.

With the movement of the rubber ring and the sliding ring as described above, the wedge ring pressed thereby also moves from the large inside diameter portion of the tapered surface of the inner surface of the tube toward the small inside diameter portion. In the elastic diameter-reduced state of the wedge ring caused by the movement of the wedge ring along the tapered surface as described, the encroaching of the wedge ring on the outer peripheral surface of the pipe is carried out precisely. Accordingly, the pipe is prevented from slipping out of the tube so that the connecting state of the pair of pipes inserted into the respective half portions of the tube is firmly maintained.

Further, when a peripheral edge of one end of the rubber ring is present between the sliding ring and the wedge ring, and a peripheral edge of the other end of the rubber ring is present between the sliding ring and the sliding-preventing shoulder, the sliding ring assumes a state of being wrapped in the rubber ring except the sliding surface relative to the inner surface of the tube to enhance an integrality of the sliding ring and the rubber ring. In addition, the contact of the sliding ring with the shoulder and with the wedge ring are carried out in a buffer manner through, the rubber material. Further, the diameter-reducing operation of the wedge ring at the time of pressing operation on the wedge ring caused by the sliding ring and the rubber ring is carried out properly without bringing forth the irregular deformation of the wedge ring.

Furthermore, when the sliding ring is formed of hard plastic material, a convex portion formed on the outer periphery of the rubber ring is fitted in a recess formed along the inner periphery of the sliding ring, the work of assembling the rubber ring on the sliding ring when the pipe joint is manufactured is considerably simplified, and the integrality of the sliding ring and the rubber ring is maintained without trouble when in use.

A pipe joint in one form of embodiments according to the present invention will be explained hereinafter with reference to the drawings.

DESCRIPTION OF THE INVENTION

Figure 1:
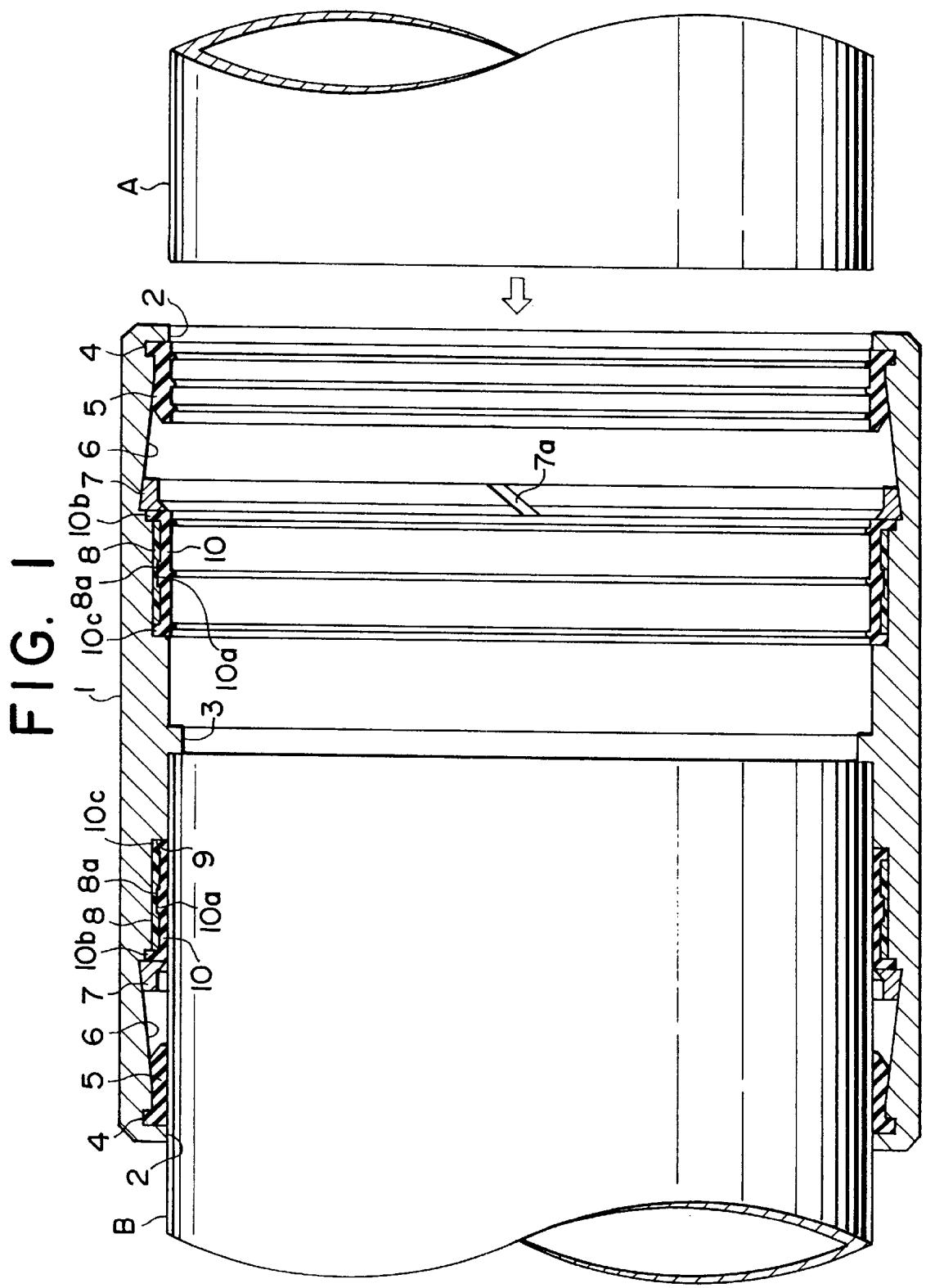
FIG. 1 is a longitudinal sectional view of a pipe joint in one form of embodiments according to the present invention.
Figure 2:
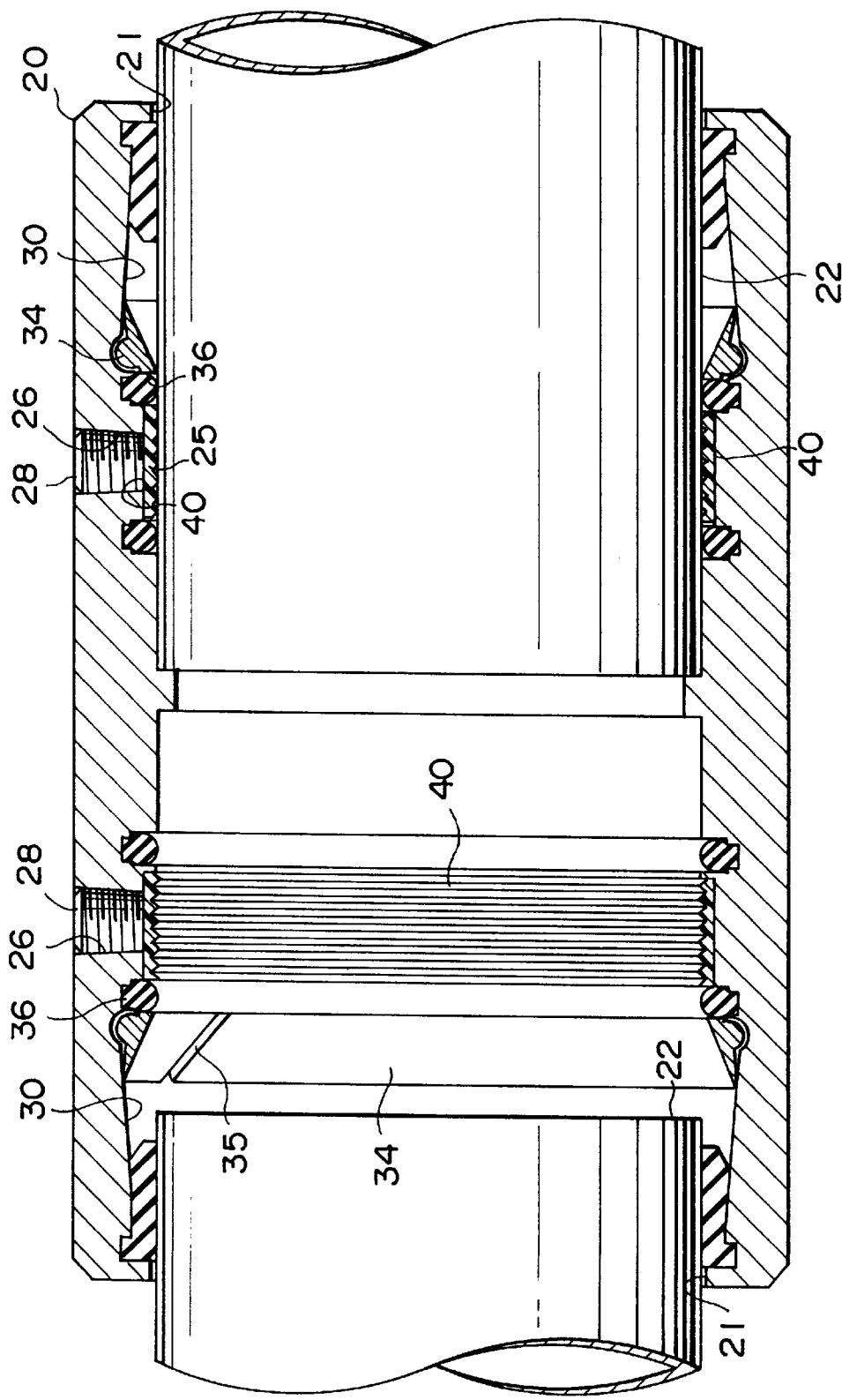
FIG. 2 is a longitudinal sectional view showing a conventional pipe joint.

FIG. 1 is a longitudinal sectional view of the pipe joint.

Also in the pipe joint according to the present embodiment, as shown in FIG. 1, pipe inserting openings 2 are provided in opposite ends of a tube 1 so as to be able to overlap on outer peripheral surfaces of ends of a pair of pipes A and B joined together, and a flange 3 for controlling entry of the pipes A and B is provided on the central inner periphery of the tube 1.

The pipe inserting openings 2 in opposite ends of the tube are provided in the inner peripheral portions with seal rings 5 made of rubber engaged with and held on recesses 4 formed in the inner peripheral portions.

A tapered surface 6 which is gradually reduced in inside diameter toward the corresponding openings 2 is formed in each inner peripheral portion of both half portions of the tube 1, and a wedge ring 7 is charged into a large inside diameter portion of the tapered surface 6. This wedge ring 7 is constituted as an elastic wedge ring having a diameter-reducing split groove 7a so that the former assumes a diameter-reduced state when moving toward the small inside diameter portion of the tapered surface 6 to enable encroachment on the outer peripheral surfaces of the pipes A and B, the elastic wedge ring being made of a steel material hardened.

Further, in the inner peripheral portions of each half portion of the tube 1, a sliding ring 8 capable of smoothly sliding along the inner surface of the tube 1 is provided adjacent to the wedge ring 7 in the large inside diameter portion of the tapered surface 6, and a sliding-preventing shoulder 9 for preventing the sliding ring 8 from sliding in a direction away from the wedge ring 7 is formed in the inner peripheral direction of the tube 1.

A rubber ring 10 capable of being placed in close contact with the outer peripheral surfaces of the pipes A and B inserted from the openings 2 is engaged with and held on the inner peripheral portion of the sliding ring 8. In the present embodiment, the sliding ring 8 is made of a hard plastic material (for example, hard vinyl chloride), and a convex portion 10a formed on the outer periphery of the rubber ring 10 is fitted in a recess 8a formed along the inner periphery of the sliding ring 8.

A peripheral edge 10b of one end of the rubber ring 10 is present between the sliding ring 8 and the wedge ring 7, and a peripheral edge 10c of the other end of the rubber ring 10 is present between the sliding ring 8 and the sliding-preventing shoulder 9.

In the pipe joint according to the aforementioned embodiment, when the pipes A and B joined together are inserted into the tube 1 through the openings 2 of the tube 1, the rubber ring 10 engaged with and held on the inner peripheral portion of the sliding ring 8 within the tube assumes a state in close contact with the outer peripheral surfaces of the pipes A and B. In this manner, a pair of pipes A and B inserted from the openings 2 on the both ends of the tube 1 is connected.

When the pipes A and B receive the external force in a direction of slipping out of the tube 1, the rubber ring 10 in close contact with the tube 1 also moves toward the openings 2 along with the tube 1. Such a movement of the rubber ring 10 as described is carried out without trouble since the sliding ring 8 integral with the rubber ring 10 can be slidably moved smoothly along the inner surface of the tube 1.

With the movement of the rubber ring 10 and the sliding ring 8 as described above, the wedge ring 7 pressed thereby also moves from the large inside diameter portion of the tapered surface 6 of the inner surface of the tube 1 toward the small inside diameter portion. In the elastic diameter-reduced state of the wedge ring 7 caused by the movement of the wedge ring 7 along the tapered surface 6 as described, the encroaching of the wedge ring 7 on the outer peripheral surfaces of the pipes A and B is carried out precisely. Accordingly, the pipes A and B are prevented from slipping out of the tube 1 so that the connecting state of the pair of pipes A and B inserted into the respective half portions of the tube 1 is firmly maintained.

Further, when a peripheral edge 10b of one end of the rubber ring 10 is present between the sliding ring 8 and the wedge ring 7, and a peripheral edge 10c of the other end of the rubber ring 10 is present between the sliding ring 8 and the sliding-preventing shoulder 9, the sliding ring 8 assumes a state of being wrapped in the rubber ring 10 except the sliding surface relative to the inner surface of the tube 1 to enhance an integrality of the sliding ring 8 and the rubber ring 10. In addition, the contact of the sliding ring 8 with the shoulder 9 and with the wedge ring 7 are carried out in a buffer manner through the rubber material. Further, the diameter-reducing operation of the wedge ring 7 at the time of pressing operation on the wedge ring 7 caused by the sliding ring 8 and the rubber ring 10 is carried out properly without bringing forth the irregular deformation of the wedge ring 7.

Furthermore, when the sliding ring 8 is formed of hard plastic material, a convex portion 10a formed on the outer periphery of the rubber ring 10 is fitted in a recess 8a formed along the inner periphery of the sliding ring 8, the work of assembling the rubber ring 10 on the sliding ring 8 when the pipe joint is manufactured is considerably simplified, and the integrality of the sliding ring 8 and the rubber ring 10 is maintained without trouble when in use.

The effects of the pipe joint according to the present invention may be summarized as follows:

(1) When the pipes joined together are inserted into the tube through the openings of the tube, the rubber ring engaged with and held on the inner peripheral portion of the sliding ring within the tube assumes a state in close contact with the outer peripheral surfaces of the pipes. In this manner, a pair of pipes inserted from the openings on the both ends of the tube is connected. When the pipes receive the external force in a direction of slipping out of the tube, the rubber ring in close contact with the tube also moves toward the openings along with the tube. Such a movement of the rubber ring as described is carried out without trouble since the sliding ring integral with the rubber ring can be slidably moved smoothly along the inner surface of the tube. With the movement of the rubber ring and the sliding ring as described above, the wedge ring pressed thereby also moves from the large inside diameter portion of the tapered surface of the inner surface of the tube toward the small inside diameter portion. In the elastic diameter-reduced state of the wedge ring caused by the movement of the wedge ring along the tapered surface as described, the encroaching of the wedge ring on the outer peripheral surface of the pipe is carried out precisely. Accordingly, the pipe is prevented from slipping out of the tube so that the connecting state of the pair of pipes inserted into the respective half portions of the tube is firmly maintained.

(2) When a peripheral edge of one end of the rubber ring is present between the sliding ring and the wedge ring, and a peripheral edge of the other end of the rubber ring is present between the sliding ring and the sliding-preventing shoulder, the sliding ring assumes a state of being wrapped in the rubber ring except the sliding surface relative to the inner surface of the tube to enhance an integrality of the sliding ring and the rubber ring. In addition, the contact of the sliding ring with the shoulder and with the wedge ring are carried out in a buffer manner through the rubber material. Further, the diameter-reducing operation of the wedge ring at the time of pressing operation on the wedge ring caused by the sliding ring and the rubber ring is carried out properly without bringing forth the irregular deformation of the wedge ring.

(3) When the sliding ring is formed of hard plastic material, a convex portion formed on the outer periphery of the rubber ring is fitted in a recess formed along the inner periphery of the sliding ring, the work of assembling the rubber ring on the sliding ring when the pipe joint is manufactured is considerably simplified, and the integrality of the sliding ring and the rubber ring is maintained without trouble when in use.

What is claimed is:

1. A pipe joint characterized in that in a tube having pipe inserting openings on opposite ends thereof so as to overlap on outer peripheral surfaces of ends of a pair of pipes to be joined together, inner peripheral portions of both half portions of the tube are formed with corresponding tapered surfaces gradually reduced in the inside diameter toward the openings, a wedge ring is charged into a large inside diameter portion of the tapered surface, the wedge ring being constituted in the form of an elastic wedge ring with a diameter reducing spilt groove in order to encroach on the outer peripheral surfaces of the pipes when the wedge ring moves toward a small inside diameter portion of the tapered surface, a sliding ring capable of smoothly sliding along the inner surface of the tube is provided adjacent to the wedge ring in the large inside diameter portion of the tapered surface, a sliding-preventing shoulder for preventing the sliding ring from sliding in a direction away from the wedge ring is formed in the inner peripheral direction of the tube, and a rubber ring capable of being placed in close contact with the outer peripheral surfaces of the pipes inserted from the openings is engaged with and held on the inner peripheral portion of the sliding ring.

2. The pipe joint according to claim 1, wherein a peripheral edge of one end of the rubber ring is present between the sliding ring and the wedge ring, and a peripheral edge of the other end of the rubber ring is present between the sliding ring and the sliding-preventing shoulder.

3. The pipe joint according to claim 1, wherein the sliding ring is formed of hard plastic material, a convex portion formed on the outer periphery of the rubber ring is fitted in a recess formed along the inner periphery of the sliding ring.

4. The pipe joint according to claim 2, wherein the sliding ring is formed of hard plastic material, a convex portion formed on the outer periphery of the rubber ring is fitted in a recess formed along the inner periphery of the sliding ring.

* * * * *